United States Patent [19]
Lee et al.

[11] Patent Number: 6,003,847
[45] Date of Patent: *Dec. 21, 1999

[54] DOWNCOMER FOR CHEMICAL PROCESS TOWER

[75] Inventors: Adam T. Lee, Richardson; Kuang Wu, Plano; Larry Burton, De Soto; Leon Fan, Carrollton, all of Tex.

[73] Assignee: Koch Enterprises, Inc., Wichita, Kans.

[ * ] Notice: This patent is subject to a terminal disclaimer.

[21] Appl. No.: 08/811,434

[22] Filed: Mar. 3, 1997

Related U.S. Application Data

[63] Continuation-in-part of application No. 08/742,819, Oct. 30, 1996, Pat. No. 5,895,608.

[51] Int. Cl.⁶ .................................................. B01F 3/04
[52] U.S. Cl. ............................. 261/114.1; 261/114.5
[58] Field of Search ........................... 261/114.1, 114.2, 261/114.4, 114.5

[56] References Cited

U.S. PATENT DOCUMENTS

| | | | |
|---|---|---|---|
| 2,476,009 | 7/1949 | Wessman | 261/114.5 |
| 3,045,989 | 7/1962 | Kittel . | |
| 3,282,576 | 11/1966 | Bruckert et al. | 261/114.1 |
| 3,729,179 | 4/1973 | Keller | 261/114.1 |
| 4,582,569 | 4/1986 | Jenkins | 261/114.5 |
| 4,603,022 | 7/1986 | Yoneda et al. | 261/114.2 |
| 5,091,060 | 2/1992 | Walker et al. | 261/114.5 |
| 5,192,466 | 3/1993 | Binkley | 261/114.1 |
| 5,453,222 | 9/1995 | Lee et al. | 261/114.1 |
| 5,454,989 | 10/1995 | Nutter . | |
| 5,547,617 | 8/1996 | Lee et al. | 261/114.1 |
| 5,702,647 | 12/1997 | Lee et al. | 261/114.1 |
| 5,895,608 | 4/1999 | Lee et al. | 261/114.1 |

FOREIGN PATENT DOCUMENTS

| | | | |
|---|---|---|---|
| 652947 | 9/1979 | U.S.S.R. | 261/114.1 |

OTHER PUBLICATIONS

Vol. 4, No. 85 Pat. Abs. of JP Jun. 18, 1980.
*Ballast Tray Design Manual*, Glitsch, Inc., Bulletin No. 4900–Fourth Edition, Feb., 1986.
"Super Frac Trays, Trays No. 36–54 & 56–66", Glitsch, Inc. DWG No. 59288, Rev 1 , Sheet 100 of 166, Feb. 23, 1996.
"Super Frac Trays, Tray No. 55", Glitsch, Inc., DWG No. 59288, Rev 2 , Sheet 101–166, Feb. 23, 1996.
"Super Frac Trays, Odd No. Trays 1–35 for T7501", Glitsch, Inc., DWG No. 59289, Rev 2 , Sheet 100 of 151, Feb., 23, 1996.
"Super Frac Trays, Even No. Trays 2–34 for T7501", Glitsch, Inc., DWG No. 59289, Rev—, Sheet 101 of 151, Feb. 23, 1996.

*Primary Examiner*—C. Scott Bushey
*Attorney, Agent, or Firm*—Shook, Hardy & Bacon L.L.P

[57] ABSTRACT

An improved downcomer for vapor liquid contact towers. The downcomer is formed between generally semi-conical walls and the wall of the tower. The downcomer outlet is formed by the lower edge of the generally semi-conical walls and the wall of the tower with the lower edge of the generally semi-conical walls being closer to the wall of the tower at the center of the downcomer outlet than at the opposing end portions of the downcomer outlet so that more liquid flows through the opposing end portions of the downcomer outlet than through the center of the downcomer outlet thereby providing a substantially uniform flow of liquid across the tray adjacent the downcomer.

3 Claims, 7 Drawing Sheets

DOWNCOMER FOR CHEMICAL PROCESS TOWER

CROSS REFERENCE TO RELATED APPLICATION

This application is a continuation-in-part of application Ser. No. 08/742,819, filed Oct. 30, 1996, now U.S. Pat. No. 5,895,608.

BACKGROUND OF THE INVENTION

1. Field of the Invention

The present invention relates to chemical process towers and, more particularly, but not by way of limitation, to a downcomer-tray assembly for maximizing efficiency in a trayed tower.

2. History of Related Art

Distillation columns are utilized to separate selected components from a multi component stream. Successful fractionation in the column is dependent upon intimate contact between liquid and vapor phases. Some columns use vapor and liquid contact devices such as trays.

The above-referenced trays are generally installed on support rings within the tower and have a solid tray or deck with a plurality of apertures in an "active" area. Liquid is directed onto the tray by means of a vertical channel from the tray above. This channel is referred to as the downcomer. The liquid moves across the active area and exits through a similar downcomer. The location of the downcomers determine the flow pattern of the liquid. Vapor ascends through the apertures in the trays and contacts the liquid moving across the tray. The liquid and vapor mix in the active area and fractionation occurs. It is the active area of the tray that is of critical concern.

The maximum fractionation capacity of the tray generally increases with an increase in the active or bubbling area. Maximum utilization of active area of a tray is an important consideration to chemical process tower design. Regions of the tray which are not effectively used for vapor-liquid contact can reduce the fractionation capacity and efficiency of the tray. Therefore, there is a need for devices and methods that optimize the active area of a fractionation tray in a chemical process tower.

It is well known that the concentration-difference between the vapor and the liquid is the driving force to effect mass transfer. Said concentration-difference can be effected in many ways; some reducing fractionation efficiency. When operating pressure is such as to produce a vapor density above about 1.0 lbs/cu. ft., there is the possibility that some amount of vapor bubbles are commingled or entrained with the downcomer incoming liquid. For example, as operating pressure increases due to an increase in the vapor concentration, descending liquid begins to absorb vapor as it moves across a tray. This is above that normally associated as dissolved gas as governed by Henry's Law and represents much larger amounts of vapor bubbles that are commingled or "entrained" with the liquid. This vapor is not firmly held and is released within the downcomer, and, in fact, the majority of said vapor must be released, otherwise the downcomer can not accommodate the liquid/vapor mixture and will flood thus preventing successful tower operation.

Similarly, an exothermic reaction in the downcomer will generate vapors from the equilibrium mixture, which also will be released. For conventional trays, the released vapor will oppose the descending frothy vapor/liquid mixture flowing into the downcomer. In many cases, such opposition leads to poor tower operation and premature flooding. Therefore, there is a need for devices and methods that facilitate the release of vapor entrained in the liquid within a downcomer of a chemical process tower.

Another serious problem which manifests itself in such operational applications is entrainment of liquid droplets in the ascending vapor. This phenomenon, which is virtually the opposite of the above vapor entrainment, can prevent effective vapor liquid contact. Liquid entrainment is, in one sense, a dynamic flow condition. High velocity vapor flow can suspend descending liquid droplets and prevent their effective passage through the underlying froth mixture zone. It is particularly difficult to prevent this problem when the tower applications require high volume vapor flow in a direction virtually opposite to that of high volume, descending liquid flow. Therefore, there is a need for devices and methods that will reduce the liquid entrained in the vapor within a chemical process tower.

Efficiency of a tray is also reduced when vapor ascending through the process column is allowed to by-pass the active area of a tray. One area where vapor can bypass the active area of a tray is the downcomer. When vapor intended for the active area of the tray unintentionally passes through the downcomer the efficiency of the active area in the tray is reduced. Also, vapor unintentionally passing through the downcomer will reduce the flow of liquid through the downcomer and potentially cause a backup of the liquid flowing through the process column. Therefore, there is a need for devices and methods that reduce the amount of vapor that flows through a downcomer.

Efficiency of the active area in a tray is also influenced by the flow of liquid across the active area. At the initial point of contact of liquid from a downcomer onto the tray, the flow of the liquid is not typically a flow characteristic that provides optimum efficiency for the active area of a tray. Therefore, there is a need for devices and methods that assist in the change of flow characteristics of fluid from a downcomer onto the active area of a tray and also across the active area of a tray. The present invention provides such a method and apparatus for maximizing mass transfer efficiency in chemical process towers.

SUMMARY OF THE INVENTION

The present invention relates to the chemical process tower downcomer configuration. More particularly, one aspect of the present invention comprises a downcomer disposed above a chemical process tower tray. The downcomer is formed by a wall region and the wall of the chemical process tower and has an outlet for the flow of liquid therefrom. The downcomer outlet is formed by the lower edge of the wall region and the wall of the chemical process tower and has a center and opposing end portions. The lower edge of the wall region is closer to the wall of the process tower at the center than at the opposing end portions so that more liquid flows through the opposing end portions than through the center of the downcomer outlet thereby creating a more uniform flow of liquid.

In another aspect of the present invention, a discharge plate is disposed across the downcomer outlet and the discharge plate has a predetermined number of apertures formed therethrough. The apertures are formed of such a size and spacing between the apertures that more liquid flows into the tray inlet area through the apertures formed in the opposing end portions of the discharge plate than through the center of the discharge plate thereby providing a uniform flow of liquid across the tower tray. In another aspect of the present invention, the wall region includes semi-conical walls that taper to the downcomer outlet. In another aspect of the present invention, the lower edge of the wall region comprises a smooth curved edge. In another aspect of the present invention, the lower edge of the wall region comprises multiple straight lines connected end-to-end. In another embodiment, the present invention comprises an improved method of mixing a gas with a liquid from a downcomer in a process tower using a tray, the improvement comprising the steps of supporting the tray in the process column with a tray support located below a tray support area, forming a downcomer outlet having a center and opposing end portions with the lower edge of the wall region being closer to the wall of the chemical process tower at the center than at the opposing end portions so that more liquid would flow through the opposing end portions of the downcomer outlet than through the center of the downcomer outlet, and positioning the downcomer outlet over the tray inlet area so liquid from the downcomer outlet will approximate the flow of liquid across a rectangular tray.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
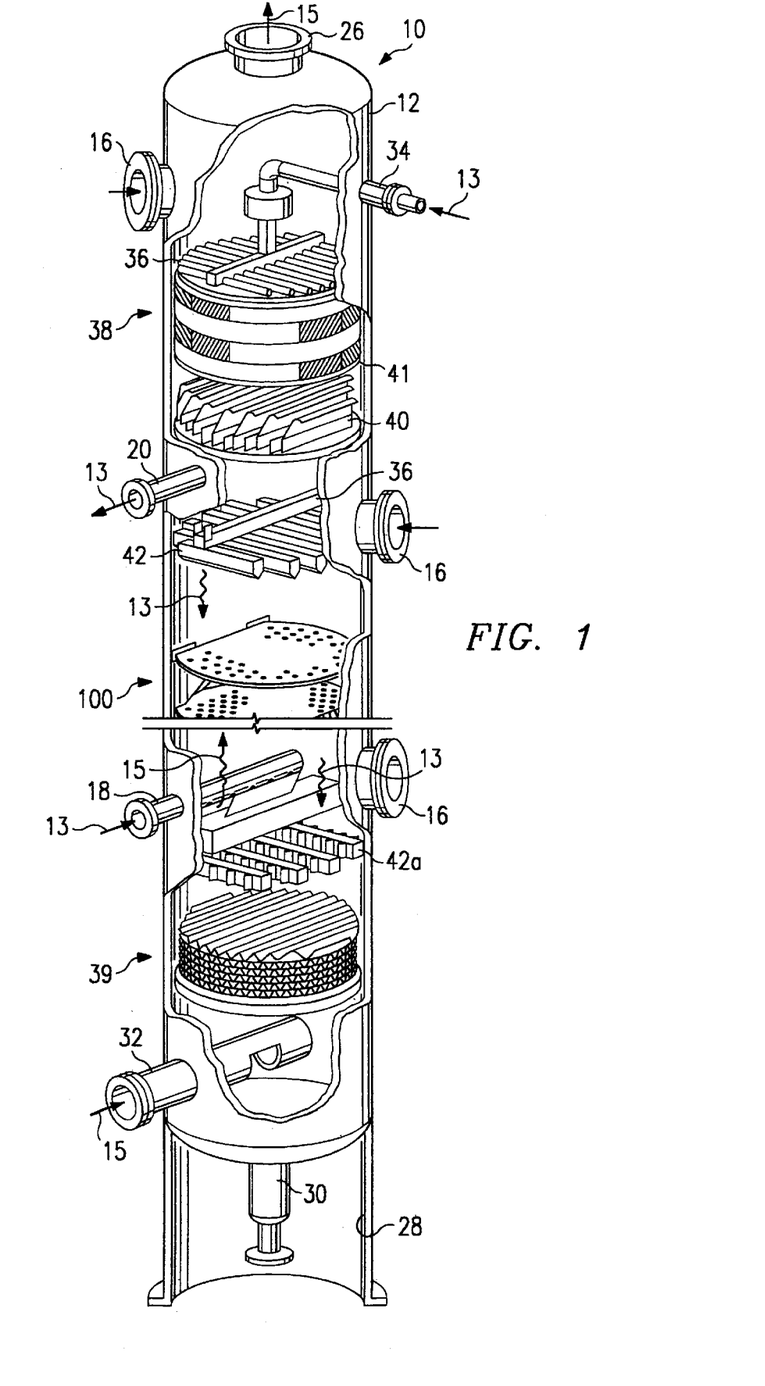
FIG. 1 is a perspective view of a packed column with various sections cut away for illustrating a variety of tower internals and one embodiment of a downcomer-tray assembly constructed in accordance with the principles of the present invention disposed therein.

Referring first to FIG. 1, there is shown a fragmentary, perspective view of an illustrative packed exchange tower or column with various sections cut away for showing a variety of tower internals and the utilization of one embodiment of the improved downcomer-tray assembly of the present invention. The exchange column 10 of FIG. 1 comprises a cylindrical tower 12 having packing beds 38 and 39, and downcomer tray assembly 100 incorporating the principles of the present invention disposed therein. The tower 12 of the column 10 includes a skirt 28 for the support of the tower 12. A plurality of manways 16 are constructed for facilitating access to the internal region of the tower 12. A stream vapor feed line or reboiler return line 32 is provided in a lower portion of the tower 12 and a vapor outlet or overhead line 26 is provided in an upper portion of the tower 12. A reflux return line 34 is provided in an upper portion of the tower 12 and a bottom stream draw off line 30 is provided at the bottom of the tower 12. Also provided are a side stream draw off line 20 and a liquid side feed line 18 in the tower 12.

Referring still to FIG. 1, in operation, vapor 15 is fed into the tower 12 through the return line 32 and liquid 13 is fed into the tower 12 through the reflux return line 34 and the side stream feed input feed line 18. The vapor 15 flows upwardly through the column 10 and ultimately leaves the tower 12 through the vapor outlet 26. The liquid 13 flows downwardly through the column 10 and ultimately leaves the tower 12 either at the side stream draw off 20, or at the bottom stream draw off line 30. In its downward flow, the liquid 13 is depleted of some material which is gained by the vapor 15 as they pass through the tray assembly 100 and the packing beds 38, 39 of the column 10, and the vapor 15 is depleted of some material which is gained by the liquid 13.

Referring still to FIG. 1, it may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper structured packing 38. A liquid distributor 42, adapted for redistributing liquid 13, is likewise disposed there-beneath. A second type of distributor 42a is shown below the cut-line and disposed above the lower packing bed 39. The internal arrangement of the column 10 is diagrammatical only and is provided for referencing various component arrays therein.

Figure 2:
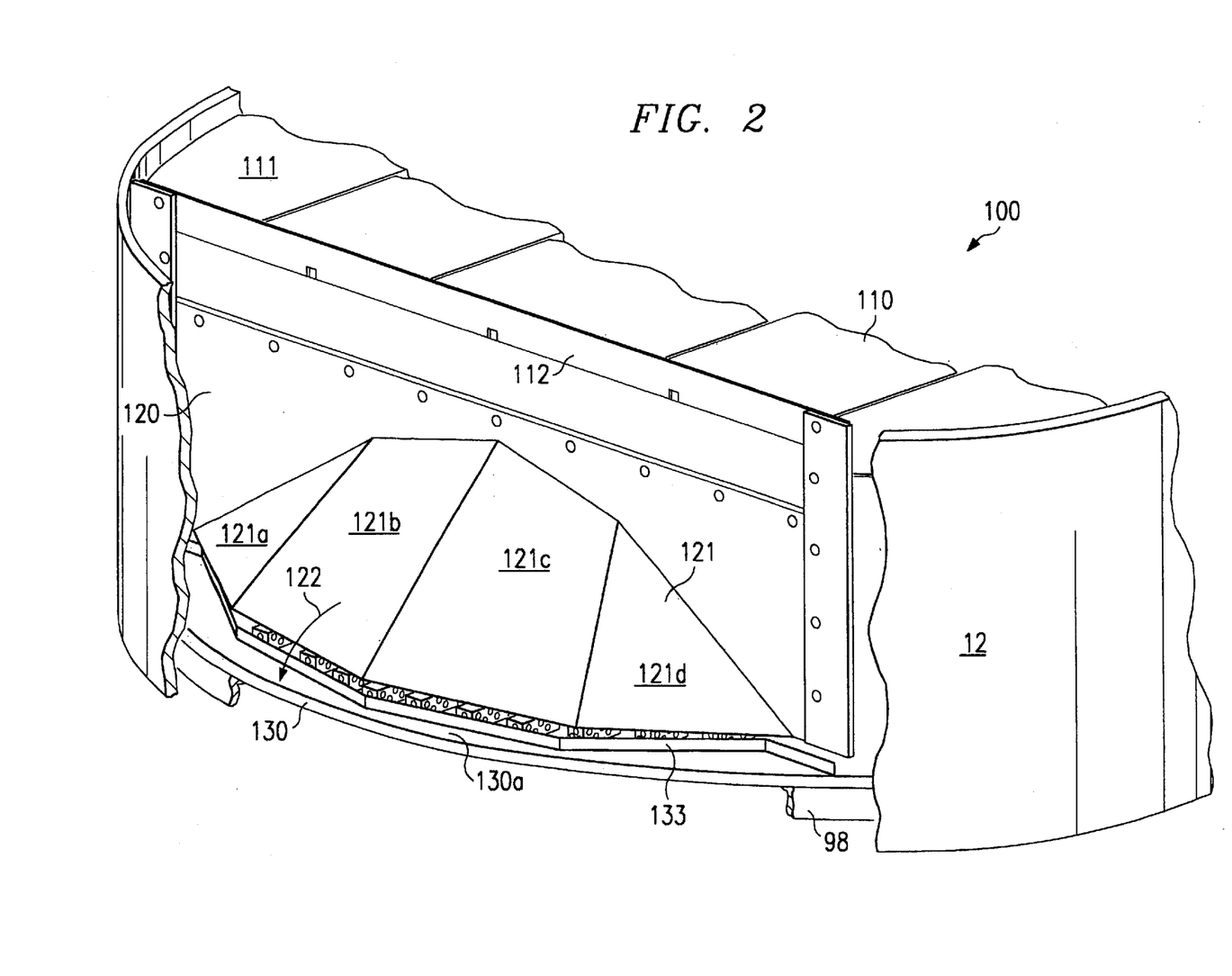
FIG. 2 is an enlarged, fragmentary, perspective view of the downcomer-tray assembly in FIG. 1, with portions of the tower cut away and illustrating the construction of the downcomer and tray of the present invention.
Figure 3:
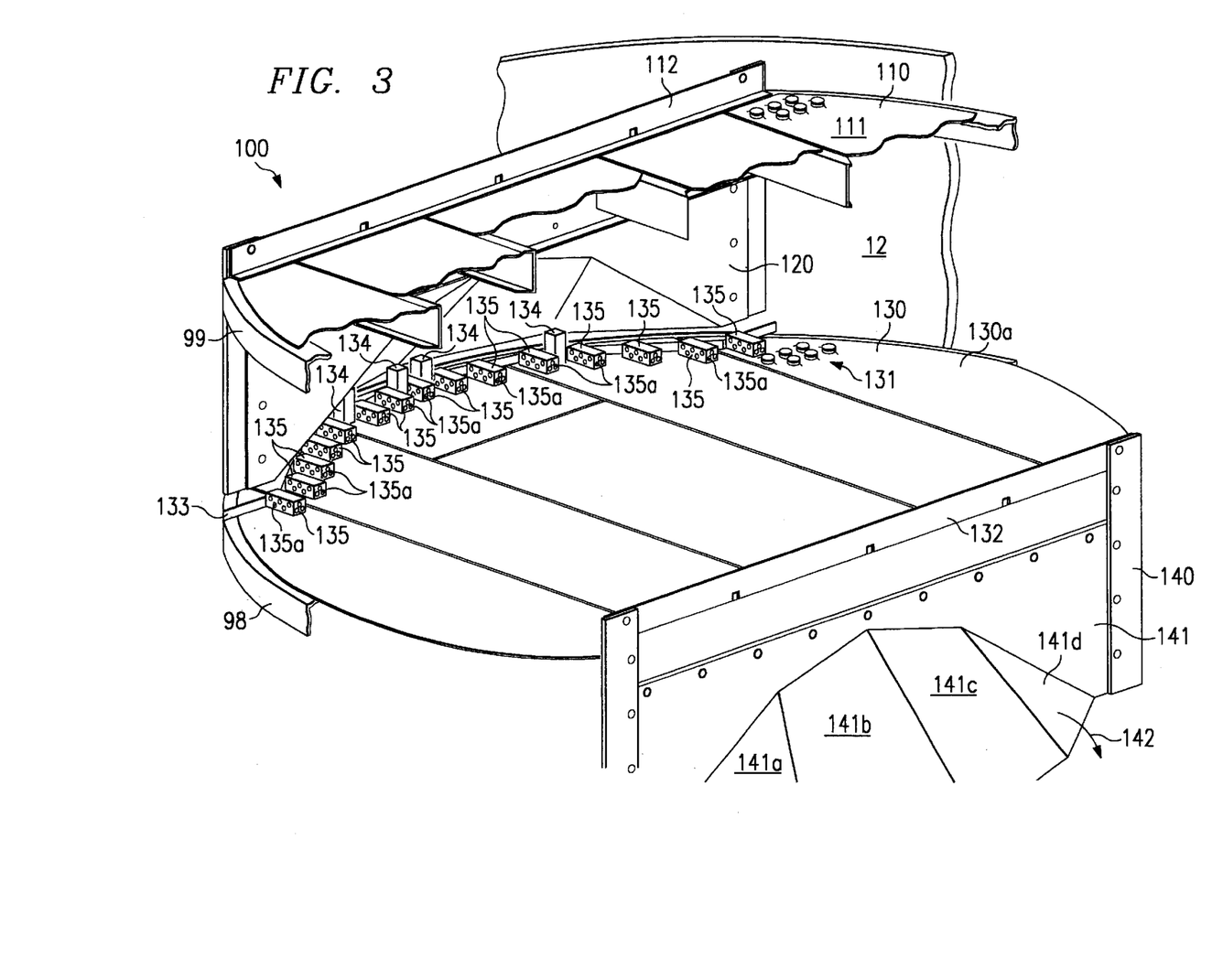
FIG. 3 is an enlarged, fragmentary, perspective view of the downcomer tray assembly of FIG. 2, taken from the inside of the tower.

Referring now to FIGS. 2 and 3, there are shown two fragmentary perspective views of the downcomer-tray assembly 100 in FIG. 1 taken from opposite angles relative to the tower 12. In this embodiment, the downcomer tray assembly 100 includes a first tray 110 connected to a first downcomer 120, and a second tray 130 connected to a second downcomer 140. The trays 110 and 130 are generally planar panels that have central active areas 111 and 131, respectively. The trays 110 and 130 are supported by support rings 98 and 99, respectively, of the tower 12. Outlet weirs 112 and 132 are disposed of on the first and second trays 110 and 130, respectively, adjacent to the downcomers 120 and 140, respectively. The outlet weirs 112 and 132 are preferably an upright plate or strip welded to the planar panels of the trays 120 and 140.

Still referring to FIGS. 2 and 3, the downcomers 120 and 140 have semi-conical walls 121 and 141, respectively, that taper from the outlet weirs 112 and 132 of the trays 110 and 130, downwardly towards the inner surface of the tower 12. The walls 121 and 141 of the downcomers 120 and 140 are preferably formed from flat plates 121a–d and 141a–d, respectively, that are welded together in a configuration shown herein. The actual construction of the downcomer may vary in accordance with the principles of the present invention. For example, the segmented-angled construction of the downcomer side walls may be modified with more downcomer sections or with fewer downcomer sections and an arcuate or curved construction. Downcomer outlets 122 and 142 are formed between the bottom of the walls 121 and 141 and the inner surface of the tower 12. In one embodiment, the downcomer outlets 122 and 142 are positioned directly above the tray support rings 98 and 99 of the tower 12 and have an opening area that is contained substantially within the area directly above the tray support rings 98 and 99.

Referring still to FIGS. 2 and 3, the tray 130 has an inlet weir 133 positioned around the area directly below the downcomer outlet 122. The inlet weir 133 is preferably an upright plate or strip welded to the planar panel of the tray 130. In one embodiment, the inlet weir 133 has a vertical height that extends above the position of the downcomer outlet 122. The lower portion of the downcomer 120 is supported by clips 134 that are welded to the inlet weir 133 and bolted to the lower portion of the downcomer 120.

Still referring to FIGS. 2 and 3, the tray 130 includes a plurality of venting chambers 135 that are disposed in the area of the tray 130 located on the opposite side of the inlet weir 133 from the downcomer outlet 122. The venting chambers 135 have a plurality of apertures 135a for using the vapor 15 to impart a horizontal flow to the liquid 13 spilling over the inlet weir 133.

Figure 4:
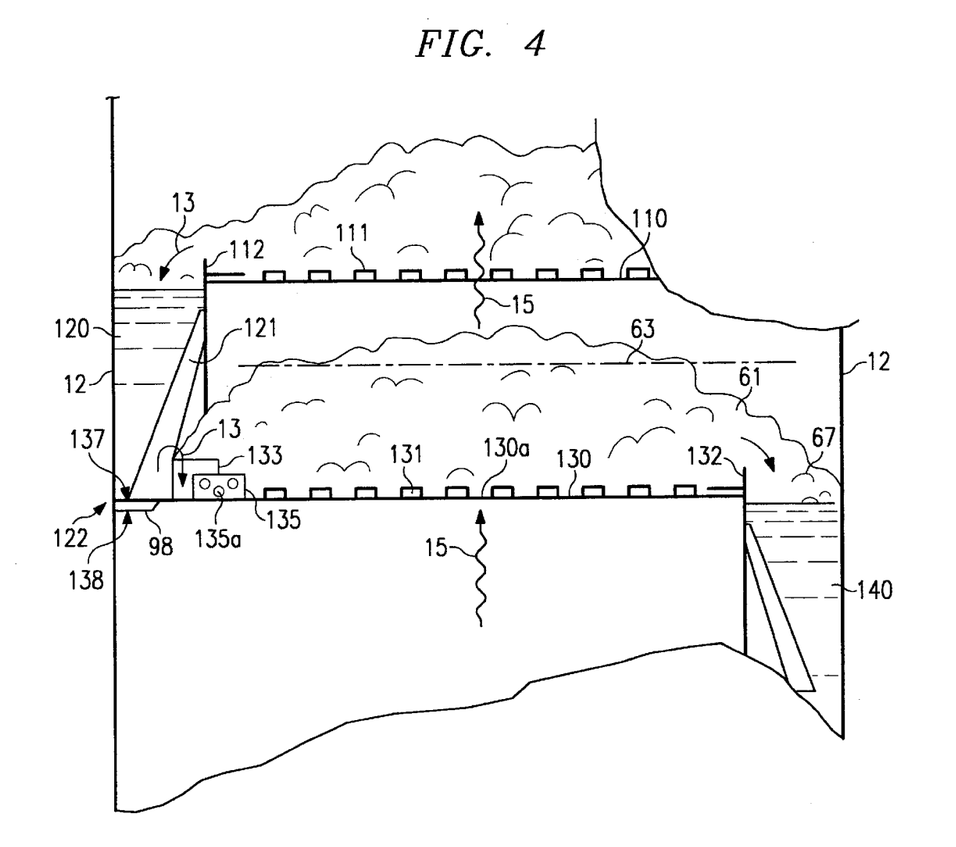
FIG. 4 is a diagrammatic, side-elevational, crosssectional view of the downcomer-tray assembly of FIGS. 2 and 3 illustrating the principles of operation thereof.

Referring now to FIG. 4, liquid 13 crossing the active area 111 of the tray 110 engages vapor 15 ascending through the active area 111. The outlet weir 112 controls the flow of liquid 13 that passes from the active area 111 of the tray 110 into the downcomer 120. Liquid 13 flowing over the outlet weir 112 of the tray 110 passes downwardly between wall 121 of the downcomer 120 and the inner wall of the tower 12. The liquid 13 exits the downcomer 120 through the outlet 122 and accumulates on the tray 130 in an area between the inlet weir 133 and the inner wall of the tower 12.

Still referring to FIG. 4, once the level of liquid 13 accumulating in the area of the tray 130 between inner wall of the tower 12 and the inlet weir 133 reaches the height of the inlet weir 133, additional liquid 13 exiting the downcomer outlet 122 will cause liquid 13 to pass or spill over the inlet weir 133. Some of the vapor 15 passing upward in the column 10 flows through the apertures 135a in the vent chambers 135 and engages the liquid 13 spilling over the inlet weir 133. The vapor 15 from the venting chambers 135 imparts a horizontal flow vector to the liquid 13 spilling over the inlet weir 133 across the active area 131 of the tray 130. The liquid 13 passing over the active area 131 of the tray 130 engages vapor 15 ascending through the active area 131.

Referring still to FIG. 4, the engagement of the liquid 13 passing across the active area 131 of the tray 130 with the vapor 15 ascending through the active area 131 creates the froth 61. As previously stated, the froth or "foam" is a region of aeration in which the phase of the liquid 13 is continuous. The froth 61 extends with a relatively uniform height, shown in phantom by line 63, across the active area 131 of the tray 130. The length of the active area 131 of the tray 130 is governed by the distance between the inlet weir 133 and the outlet weir 132. The outlet weir 132 also controls the flow of froth 61 or liquid 13 that passes from the active area 131 of the tray 130 into the downcomer 140, where the fluid exits the tray 130 for the next process in the column 10.

Figure 5A:
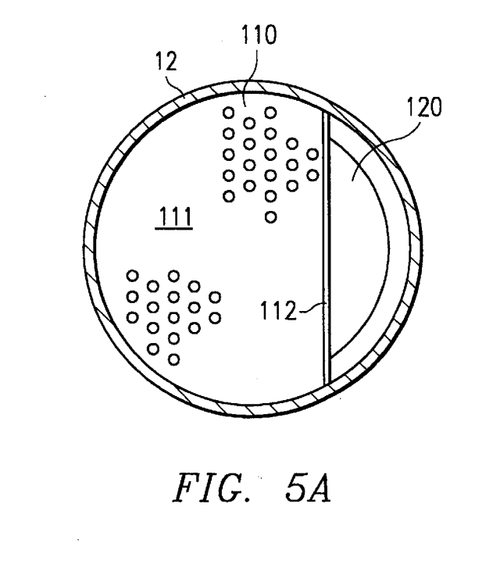
FIG. 5A is an enlarged, fragmentary top view of one embodiment of the downcomer tray assembly of FIGS. 2 and 3.

Referring now to FIG. 5A, there is shown a top view of the tray 110 and downcomer 120 illustrated in FIGS. 2, 3, and 4. The downcomer 120 is separated from the active area 111 of the tray 110 by the outlet where weir 112. In the embodiment illustrated in FIG. 5A, the downcomer 120 is a chordal downcomer characterized by the linear outlet weir 112 of the tray 110 defining the edge of the tray 110 in a chordal manner.

Figure 5B:
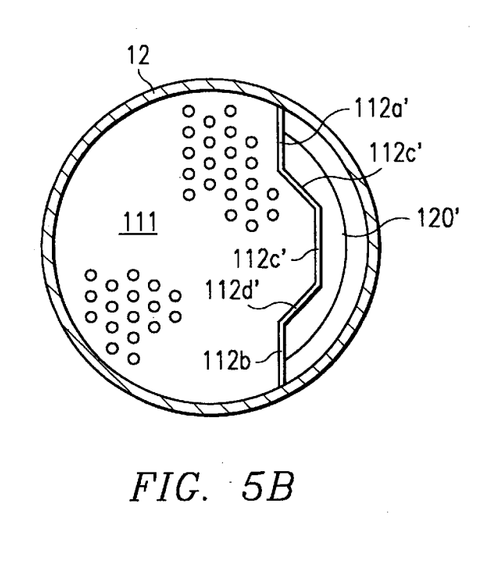
FIG. 5B is an enlarged, fragmentary top view of another embodiment of the downcomer-tray assembly of FIGS. 2 and 3.

Referring now to FIG. 5B, there is illustrated a top view of another embodiment of the tray 110 and downcomer 120 from FIGS. 2, 3, and 4. In the embodiment illustrated in FIG. 5B, the downcomer 120' is a swept downcomer (or multi-chordal downcomer) and is characterized by the outlet weir 112' having many segments. The outlet weir 112' has first and second segments 112a' and 112b' that are positioned in a co-linear chordal fashion. A third section 112c' is parallel to the first and second sections 112a' and 112b', but is disposed centered between the first and second sections 112a' and 112b', and offset towards the tower 12. Fourth and fifth sections 112d' and 112e' of the outlet weir 112' connect the third section 112c' with the first section 112a' and the second section 112b', respectively.

Figure 5C:
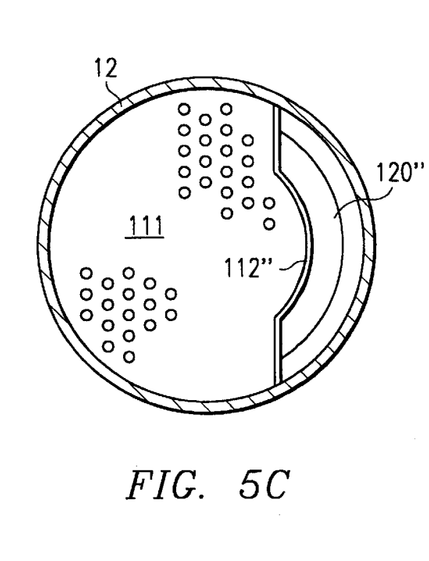
FIG. 5C is an enlarged, fragmentary top view of another embodiment of the downcomer-tray assembly of FIG. 2 and 3.

Referring now to FIG. 5C, there is shown a top of view of yet another embodiment of the tray 110 and downcomer 120 illustrated in FIGS. 2, 3, and 4. In the embodiment illustrated in FIG. 5C, the downcomer 120 is defined by the outlet weir 112". The outlet weir 112" is characterized by arcuate section that is semi-circular extending towards the downcomer 120.

Referring now to FIGS. 2, 3, 4, and 5A–C in combination, the downcomer outlet 122 is narrower than the upper region of the downcomer 120, causing a build up in the region of the downcomer outlet 122 of liquid 13 flowing through the downcomer 120. The build up of liquid 13 in the region of the downcomer outlet 122 causes a dynamic seal that prevents vapor 15 ascending through the column 10 from passing through the downcomer 120 instead of the tray 110. A seal is also created by relative vertical heights of the outlet 122 for the downcomer 120 and the inlet weir 133 of the tray 130. A pool of liquid 13 from the downcomer 120 is created between the inlet weir 133 and the inner wall of the tower 12. When the vertical height of the outlet 122 for the downcomer 120 is located near or below the vertical height of the inlet weir 133 for the tray 130, outlet 122 will be immersed in the pool of liquid accumulated between the inlet weir 133 and the inner surface of the tower 12. Because the outlet 122 of the downcomer 120 is at or below the level of a pool of liquid accumulated between the inlet weir 133 of the tray 130 and the inner surface of the tower 12, vapor 15 ascending through the column 10 will be inhibited from flowing through the downcomer 120 and by-passing the tray 110.

Still referring to FIGS. 2, 3, 4, and 5A–C, the tray 130 has a support ring region 137 on a top side 130a of the tray 130 directly above location where the support ring 98 engages the tray 130. Due to structural constraints, support ring region 137 of conventional support rings cannot ordinarily be used as an active area for the mixing of liquid 13 and vapor 15. (This aspect is addressed in U.S. Pat. No. 5,547, 617 assigned to the assignee of the present invention.) The tray 130 also has a tray inlet area 138 located at the position on the top side 130a of the tray 130 where liquid 13 from the downcomer outlet 122 first contacts the tray 130. Due to the flow of liquid 13 from the downcomer outlet 122, the tray inlet area 138 of the tray 130 cannot readily be used as an active area for the mixing of liquid 13 and vapor 15. Because the downcomer outlet 122 has an area contained above the tray support ring 98, the tray inlet area 138 is substantially within the support ring region 137 of the tray 130. By consolidating the tray inlet area 138 of the tray 130 substantially within the support ring region 137, the area of the tray 130 available for use as the active area 131 is increased over conventional tray assemblies that either do not position the tray inlet area substantially within the support ring region of the tray 130 or otherwise address this issue.

Referring still to FIGS. 2, 3, 4, and 5A–C, because the support ring 98 is a narrow band around the inner circumference of the tower 12, the support ring region 137 of the tray 130 will be a long narrow region. In order for the tray inlet area 138 to be substantially within the support ring region 137, the downcomer outlet 122 will usually need to be longer than conventional downcomers to accommodate the liquid 13 flowing through the downcomer 120. However, as shown herein, the length of the downcomer outlet 122 and corresponding tray inlet area 138 of the tray 130, can vary significantly within the tray support ring region 137 of the tray 130 without having any affect on the availability of tray active area 131 inwardly of the tray support ring region 137.

Figures 6, 7A, 8:
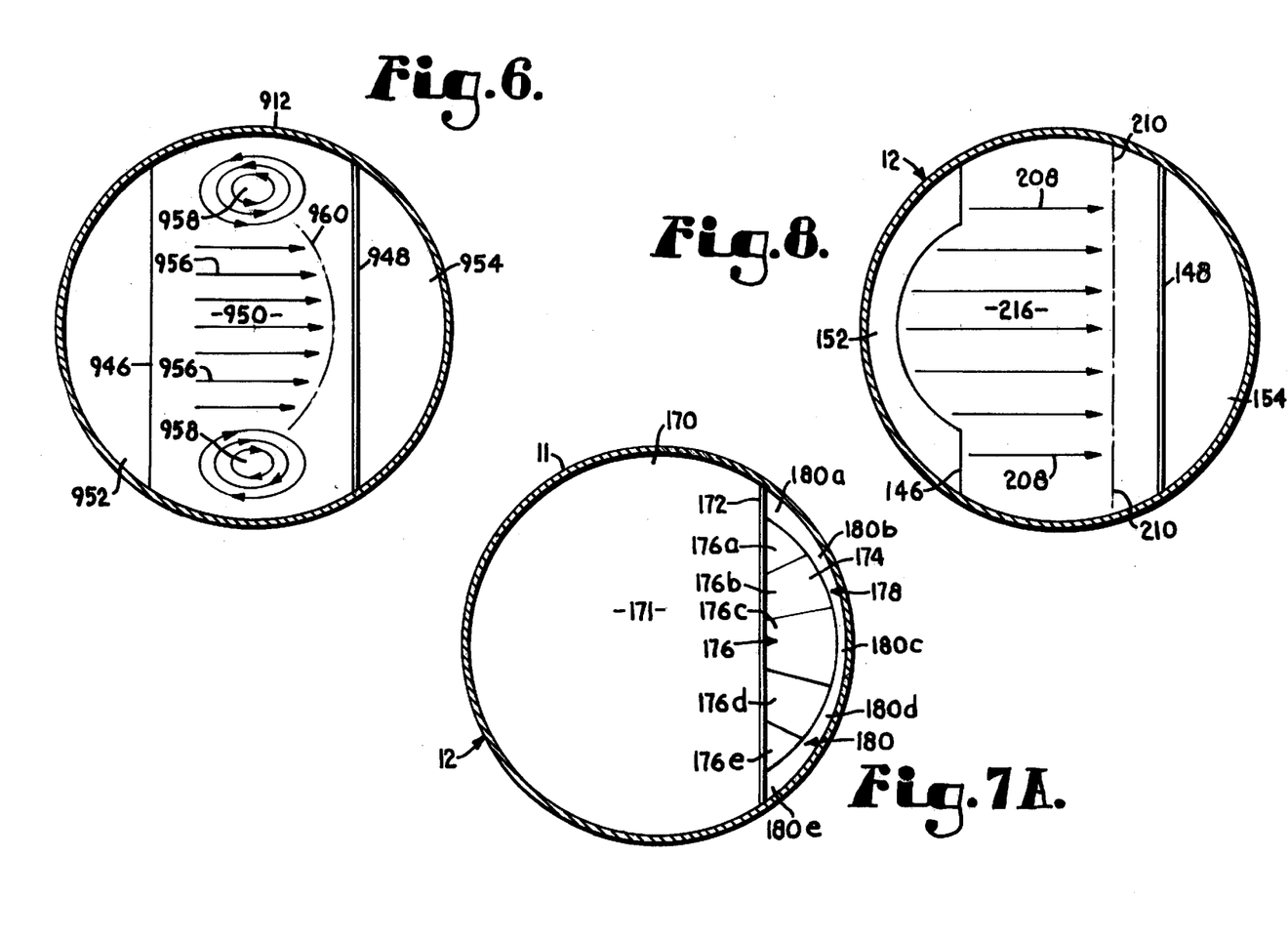
FIG. 6 is a top plan, diagrammatic view of a prior art tray illustrating the liquid flow thereacross.
FIG. 7A is an enlarged, fragmentary top view of an embodiment of a downcomer constructed in accordance with the principles of the present invention for maximizing mass transfer efficiency in chemical process towers.
FIG. 8 is a top plan, diagrammatic view of a tray illustrating the liquid flow thereacross in accordance with the principles of the present invention for maximizing mass transfer efficiency in chemical process tower.

Referring now to FIG. 6, there is shown a flow diagram across a conventional tray. The prior art tray 950 is illustrated herein as a round tray having a first conventional downcomer for feeding liquid upon a solid, underlying panel or tray inlet area 952 and then over inlet weir 946 to tray 950. A second downcomer 954 carries liquid over outlet weir 948 and away from the tray 950. A plurality of arrows 156 illustrate the non-uniform flow 960 of liquid 913 across a conventional tray 950 with the pattern producing retrograde, as manifest by recirculation cells 958. Said recirculation cells are shown to be formed on both sides of the tray lateral to the direction of flow of liquid 913. The formation of these retrograde flow areas, or recirculation cells 958, decreases the efficiency of the tray. These recirculation cells are the result of retrograde flow near the wall of tower 912 and this backflow problem becomes more pronounced as the diameter of the column increases. With the increase in retrograde flow and the resultant stagnation effect from the recirculation cells, concentration-difference driving force for mass transfer between the counter-flowing streams is reduced. The reduction in concentration-difference driving force will result in more contact or height requirement for a given separation in the column. Although back mixing is but a single aspect of tray efficiency, the reduction thereof is provided concurrently with the other advantages hereof.

Referring now to FIG. 7A, there is shown a top view of an embodiment of a downcomer constructed in accordance with the principles of the present invention for maximizing mass transfer efficiency in chemical process towers. Downcomer 174 is separated from the active area 171 of upper tray 170 by the outlet weir 172. Downcomer 174 is formed by semi-conical wall 176 and the inside surface of wall 11 of tower 12. Semi-conical wall 176 is formed from plates 176a–e, respectively, that are connected together in a configuration shown herein. The downcomer outlet 180 is formed by the curved lower edge 178 of plates 176a–e, respectively and the inner surface of wall 11 of tower 12. It will be appreciated that downcomer outlet 180 is characterized by outlet portions 180a–e, respectively, with the size of outlet portions 180a–e increasing from 180c (the center) to 180a (end portion) and from 180c to 180e (end portion). More liquid 13 is therefore allowed to flow from and through outlet portions 180a, 180b, 180d and 180e than from and through outlet portion 180c because the lower edge 178 of plates 176a–b and 176d–e, respectively, is positioned further away from the inner surface of wall 11 as lower edge 178 is formed from plate 176c to plate 176a and from plate 176c to plate 176e. It will be appreciated that the liquid 13 which flows through downcomer outlet 180 will flow onto tray inlet area 152 and over the inlet weir 146 (see FIG. 8) of lower tray 216 (see FIG. 8) and will flow across the lower tray 216 in a uniform flow, as illustrated by a plurality of arrows 208. This uniform flow is the result of more liquid 13 being introduced onto the portions of tray 216 which are located nearest the wall of tower 12 than is being introduced onto the center portion of tray 216. This uniform flow essentially eliminates the recirculation cells or retrograde flow areas.

Figure 7B:
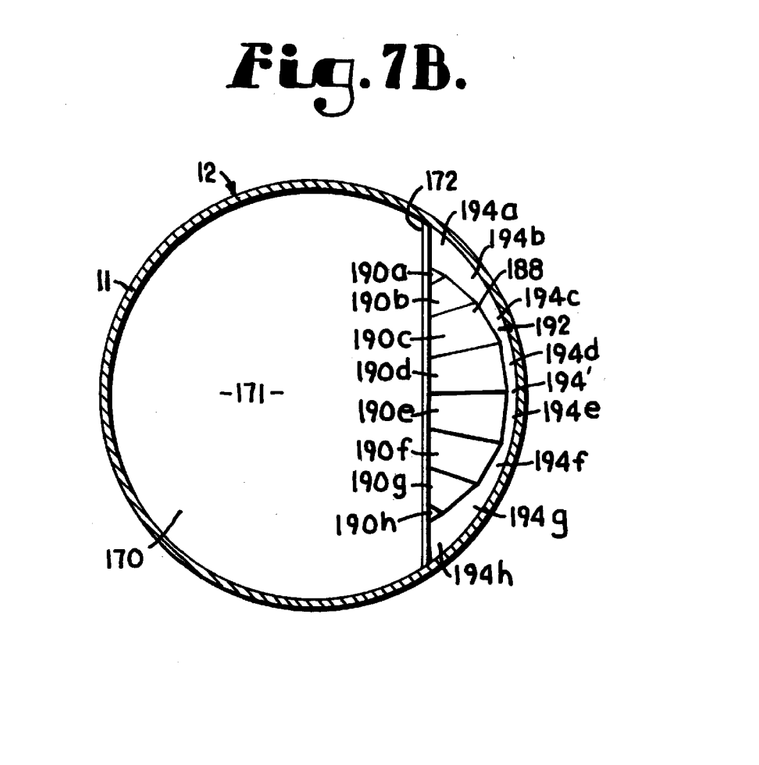
FIG. 7B is an enlarged, fragmentary top view of another embodiment of a downcomer constructed in accordance with the principles of the present invention for maximizing mass transfer efficiency in chemical process towers.

Referring now to FIG. 7B, there is shown a top view of another embodiment of a downcomer constructed in accordance with the principles of the present invention for maximizing mass transfer efficiency in chemical process towers. Downcomer 188 is separated from the active area 171 of upper tray 170 by the outlet weir 172. Downcomer 188 is formed by semi-conical wall 190 and the inside surface of wall 11 of tower 12. Semi-conical wall 190 is formed from plates 190a–h, respectively, that are connected together in a configuration shown herein. The downcomer outlet 194 is formed by the segmented lower edge 192 of plates 190a–h, respectively and the inner surface of wall 11 of tower 12. It will be appreciated that downcomer outlet 194 is characterized by outlet portions 194a–h, respectively, with the size of outlet portions 194a–h increasing from center 194' to 194a (end portion) and from center 194' to 194h (end portion). More liquid 13 is therefore allowed to flow from and through outlet portions 194a, 194b, 194c, 194f, 194g and 194h than from and through outlet portions 194d and 194e because the lower edge 192 of plates 190a–c and 190e–h, respectively, is positioned further away from the inner surface of wall 11 as lower edge 192 is formed from plate 190d to plate 190a and from plate 190e to plate 190h. It will be appreciated that the liquid 13 which flows through downcomer outlet 194 will flow into tray inlet area 152 and over the inlet weir 146 (see FIG. 8) of lower tray 216 (see FIG. 8) below tray 170 and will flow across tray 216 as uniform flow, as illustrated by a plurality of arrows 208. This uniform flow is the result of more liquid 13 being introduced onto the portions of tray 216 which are located nearest the wall of tower 12 than is being introduced onto the center portion of tray 216 and which essentially eliminates the recirculation cells or retrograde flow areas.

Figure 7C:
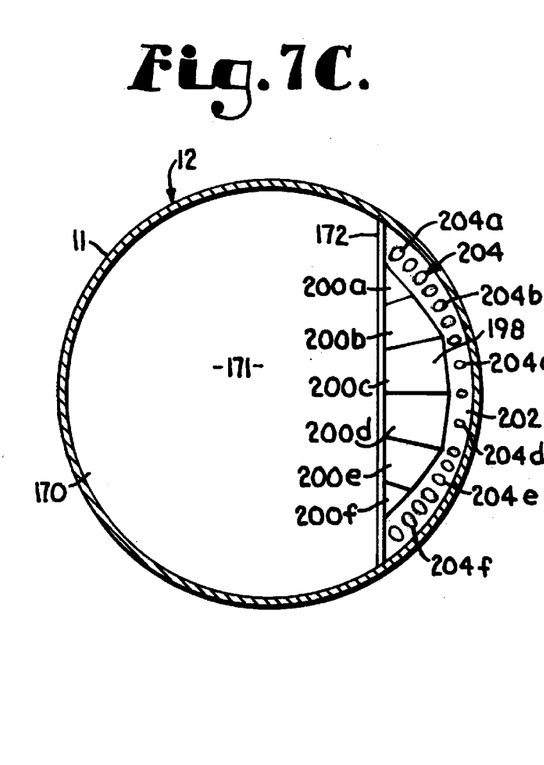
FIG. 7C is an enlarged, fragmentary top view of another embodiment of a downcomer constructed in accordance with the principles of the present invention for maximizing mass transfer efficiency in chemical process towers.

Referring now to FIG. 7C, there is shown a top view of an additional embodiment of a downcomer constructed in accordance with the principles of the present invention for maximizing mass transfer efficiency in chemical process towers. Downcomer 198 is separated from the active area 171 of tray 170 by the outlet weir 172. Downcomer 198 is formed by semi-conical wall 200 and the inside surface of wall 11 of tower 12. Semi-conical wall 200 is formed from plates 200a–f, respectively, that are connected together in a configuration shown herein. The downcomer outlet 204 is formed by discharge apertures 204a–f formed in discharge plate 202. Discharge plate 202 extends from the lower edge of plates 200a–f to the inner surface of wall 11 of tower 12 so that any liquid 13 which exits from downcomer 198 can only exit through discharge apertures 204a–f. It will be appreciated that downcomer outlet 204 is characterized by the size and number of discharge apertures increasing from 204c to 204a and from 204d to 204f. More liquid 13 is therefore allowed to flow from and through discharge apertures 204a and 204b than from discharge aperture 204c and also apertures 204e and 204f than from discharge aperture 204d. It will be appreciated that the liquid 13 which flows through discharge apertures 204a–f will flow into tray inlet area 152 and over the inlet weir 146 (see FIG. 8) of tray 216 (see FIG. 8) below tray 170 and will flow across tray 216 in a uniform manner, effectively approximating flow in a generally rectangular tower as illustrated by a plurality of arrows 208. This uniform flow is the result of more liquid 13 being introduced onto the portions of tray 216 which are located nearest the wall of tower 12 than is being introduced onto the center portion of tray 216 and which essentially eliminates the recirculation cells or retrograde flow areas.

Referring now to FIG. 8, there is shown a flow diagram across a tray 216 which receives liquid from the present inventive downcomer after the liquid has been fed to the tray inlet area 152 and then over the inlet weir 146 to tray 216. A plurality of arrows 208 illustrate the uniform flow of liquid across tray 216 which essentially eliminates the recirculation cells or retrograde flow areas and thereby enhancing interaction of vapor and liquid passing in counter-current flow through the tower 12.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:

1. An apparatus for facilitating enhanced interaction of vapor and liquid passing in counter-current flow through a process tower, said process tower having a wall and at least one tray supported therein, said at least one tray having a tray inlet area and a tray outlet area, said apparatus comprising:

a downcomer disposed above said at least one tray;

said downcomer being formed between a wall region and the wall of said process tower and having an outlet for the flow of liquid therefrom; and said downcomer outlet disposed above said tray inlet area, said downcomer outlet being formed by a lower edge of the wall region and the wall of said process tower and having a center and opposing end portions with the lower edge of the wall region being closer to the wall of said process tower at the center than at the opposing end portions so that more liquid flows through the opposing end portions of the downcomer outlet than through the center of the downcomer outlet, thereby providing substantially uniform flow of liquid across said tray.

2. The apparatus as set forth in claim 1, wherein said wall region includes a semi-conical wall that tapers to said downcomer outlet.

3. The apparatus as set forth in claim 1, wherein said lower edge of the wall region comprises multiple straight lines connected end-to-end.

* * * * *

US006003847C1

(12) EX PARTE REEXAMINATION CERTIFICATE (5203rd)
United States Patent
Lee et al.

(10) Number: US 6,003,847 C1
(45) Certificate Issued: *Sep. 20, 2005

(54) DOWNCOMER FOR CHEMICAL PROCESS TOWER

(75) Inventors: Adam T. Lee, Richardson, TX (US); Kuang Wu, Plano, TX (US); Larry Burton, De Soto, TX (US); Leon Fan, Carrollton, TX (US)

(73) Assignee: Koch-Glitsch, LP, Wichita, KS (US)

Reexamination Request:
No. 90/006,448, Nov. 12, 2002

Reexamination Certificate for:
Patent No.: 6,003,847
Issued: Dec. 21, 1999
Appl. No.: 08/811,434
Filed: Mar. 3, 1997

( * ) Notice: This patent is subject to a terminal disclaimer.

Related U.S. Application Data (63) Continuation-in-part of application No. 08/742,819, filed on Oct. 30, 1996, now Pat. No. 5,895,608.

(51) Int. Cl.⁷ .................................................. B01F 3/04
(52) U.S. Cl. .............................. 261/114.1; 261/114.5

(56) References Cited

U.S. PATENT DOCUMENTS

| | | | |
|---|---|---|---|
| 2,254,370 A | 9/1941 | Kaplan | |
| 2,752,139 A | 6/1956 | Huggins | |
| 2,960,322 A | 11/1960 | Eld | |
| 3,056,592 A | 10/1962 | Thrift | |
| 3,245,669 A | 4/1966 | Huggins et al. | |
| 3,401,090 A | 9/1968 | Greenfield | |
| 3,658,306 A | 4/1972 | Jones | 261/114 |
| 3,797,811 A | * 3/1974 | Jullien et al. | 261/114.1 |
| 4,275,021 A | 6/1981 | Kirkpatrick et al. | 261/114 |
| 4,278,621 A | 7/1981 | Sigmund et al. | 261/114 |
| 4,372,042 A | * 2/1983 | Hughes | 29/825 |
| 4,547,326 A | * 10/1985 | Weiler | 261/114.1 |
| 4,749,528 A | 6/1988 | Lavin | 261/114 |
| 5,378,267 A | * 1/1995 | Bros et al. | 96/168 |
| 5,453,222 A | * 9/1995 | Lee et al. | 261/114.1 |
| 5,478,507 A | * 12/1995 | Bros | 261/114.1 |
| 5,480,595 A | * 1/1996 | Yeoman et al. | 261/114.1 |
| 5,618,473 A | * 4/1997 | Sauter et al. | 261/114.1 |
| 5,632,935 A | 5/1997 | Yeoman et al. | 261/114 |
| 5,948,211 A | 9/1999 | Yeoman et al. | 202/158 |

OTHER PUBLICATIONS

Muller et al., "Improving Flow Patterns in a Distillation Tray by Modifying Downcomer Apron Shape," *Chem. Eng. Comm.*, 1988 vol. 74, pp. 195–208.
Washer, "Distillation," 1963, pp. 167–169.
Drawing entitled "Plan of Sieve Trays", dated Nov. 2, 1993.

* cited by examiner

*Primary Examiner*—Chester T Barry (57) ABSTRACT

An improved downcomer for vapor liquid contact towers. The downcomer is formed between generally semi-conical walls and the wall of the tower. The downcomer outlet is formed by the lower edge of the generally semi-conical walls and the wall of the tower with the lower edge of the generally semi-conical walls being closer to the wall of the tower at the center of the downcomer outlet than at the opposing end portions of the downcomer outlet so that more liquid flows through the opposing end portions of the downcomer outlet than through the center of the downcomer outlet thereby providing a substantially uniform flow of liquid across the tray adjacent the downcomer.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–3 are cancelled.

* * * * *